US008853985B2

United States Patent
Krishnamoorthy et al.

(10) Patent No.: US 8,853,985 B2
(45) Date of Patent: Oct. 7, 2014

(54) BACK-EMF DETECTION FOR MOTOR CONTROL

(75) Inventors: Ravishanker Krishnamoorthy, Singapore (SG); Foo Leng Leong, Singapore (SG); Edy Susanto, Singapore (SG)

(73) Assignee: Marvell World Trade Ltd. (BB)

( * ) Notice: Subject to any disclaimer, the term of this patent is extended or adjusted under 35 U.S.C. 154(b) by 168 days.

(21) Appl. No.: 13/223,705

(22) Filed: Sep. 1, 2011

(65) Prior Publication Data

US 2012/0068649 A1  Mar. 22, 2012

Related U.S. Application Data

(60) Provisional application No. 61/383,991, filed on Sep. 17, 2010.

(51) Int. Cl.
*H02P 1/00* (2006.01)
*H02P 6/18* (2006.01)

(52) U.S. Cl.
CPC ............... *H02P 6/182* (2013.01); *H02P 6/187* (2013.01)
USPC ................. 318/459; 318/400.04; 318/400.34; 318/400.35; 318/801; 360/73.02; 360/72.2; 360/78.14; 360/70

(58) Field of Classification Search
USPC ................. 318/400.35, 811, 139, 599, 400.2, 318/400.23, 459, 722, 802, 400.09, 400.4, 318/268, 801, 803, 804, 805, 806, 807, 808, 318/809, 810, 437; 360/73.02, 70, 72.2, 360/73.03, 75, 78.04, 78.14
See application file for complete search history.

(56) References Cited

U.S. PATENT DOCUMENTS

| 3,599,069 | A | * | 8/1971 | Welch | 318/696 |
|---|---|---|---|---|---|
| 4,240,036 | A | * | 12/1980 | Kohler | 330/10 |
| 4,841,207 | A | * | 6/1989 | Cheyne | 388/811 |
| 5,177,416 | A | * | 1/1993 | Inaji et al. | 318/400.11 |
| 5,631,999 | A | * | 5/1997 | Dinsmore | 388/805 |
| 5,635,810 | A | * | 6/1997 | Goel | 318/719 |
| 5,672,948 | A | * | 9/1997 | Cohen et al. | 318/603 |
| 5,708,337 | A | * | 1/1998 | Breit et al. | 318/400.09 |
| 5,811,946 | A | * | 9/1998 | Mullin et al. | 388/811 |
| 5,869,944 | A | * | 2/1999 | Tanina | 318/599 |
| 5,953,491 | A | * | 9/1999 | Sears et al. | 388/811 |
| 5,969,491 | A | * | 10/1999 | Viti et al. | 318/400.35 |
| 6,005,316 | A | * | 12/1999 | Harris | 310/90.5 |
| 6,252,362 | B1 | * | 6/2001 | White et al. | 318/400.35 |
| 6,515,443 | B2 | * | 2/2003 | Kelly et al. | 318/599 |
| 6,580,236 | B2 | * | 6/2003 | Mitsuda | 318/400.17 |
| 6,667,598 | B2 | * | 12/2003 | Shimohara | 318/811 |

(Continued)

OTHER PUBLICATIONS

Patent Cooperating Treaty (PCT) International Search Report and Written Opinion in co-pending PCT International Application No. PCT/IB2011/002606 (International Filing Date Sep. 1, 2011) having a Date of Mailing of Jan. 28, 2013 (16 pgs).

*Primary Examiner* — Shawki S Ismail
*Assistant Examiner* — Jorge L Carrasquillo (57) ABSTRACT

Systems, methods, and other embodiments associated with back-EMF detection for motor control are described. In an embodiment, an apparatus includes a drive circuit configured to apply excitation signals to respective inputs of a motor, a signal inhibit circuit configured to convey a signal to inhibit application of the excitation signals during an interval, and a measuring circuit configured to measure a back-electromotive force (EMF) signal crossing a reference signal during the interval.

20 Claims, 4 Drawing Sheets

(56) References Cited

U.S. PATENT DOCUMENTS

| | | | |
|---|---|---|---|
| 7,098,621 B1 * | 8/2006 | Leong et al. | 318/400.34 |
| 7,138,776 B1 * | 11/2006 | Gauthier et al. | 318/400.34 |
| 7,193,337 B2 * | 3/2007 | Nguyen | 307/130 |
| 7,265,612 B2 * | 9/2007 | Ho et al. | 330/10 |
| 7,636,220 B1 * | 12/2009 | Chui et al. | 360/75 |
| 8,013,552 B2 * | 9/2011 | Dahlberg et al. | 318/400.11 |
| 2005/0110442 A1 * | 5/2005 | Trifilo | 318/254 |
| 2006/0066280 A1 * | 3/2006 | Bhaumik et al. | 318/599 |
| 2006/0186846 A1 * | 8/2006 | Lassen | 318/439 |
| 2008/0100238 A1 * | 5/2008 | Shaw | 318/268 |
| 2009/0096397 A1 * | 4/2009 | Paintz et al. | 318/400.35 |
| 2009/0230905 A1 * | 9/2009 | Proctor et al. | 318/400.09 |
| 2010/0253265 A1 * | 10/2010 | Clothier et al. | 318/400.14 |

\* cited by examiner

BACK-EMF DETECTION FOR MOTOR CONTROL

CROSS REFERENCE TO RELATED APPLICATIONS

This disclosure claims the benefit of U.S. provisional application Ser. No. 61/383,991 filed on Sep. 17, 2010, which is hereby wholly incorporated by reference.

BACKGROUND

In many types of electronic devices, such as portable and laptop computing devices, video recording devices, servers, and so on, an electric motor may be used to drive a cooling fan to dissipate excess heat generated within the device. By removing excess heat, processors and other components of the device can operate reliably and over extended periods of time. When excess heat is not removed, electronic devices can fail, often with serious consequences, such as loss of data, loss of processing resources, or total system failure.

When using an electric motor to drive a cooling fan, especially in portable electronic device applications, a premium may be placed on the power efficiency of the electric motor. Thus, fans driven by motors that consume an inordinate amount of battery power may not be best suited for use in portable devices. In applications such as laptop and desktop computer environments in which users may be located in close proximity with the device, electric motor-driven cooling fans may emit an unacceptable level of acoustic noise that may be distracting to the user.

To bring about the efficient and quiet operation of an electric motor, one or more of the motor's operating parameters may be monitored. In some types of electric motors, a Hall-effect sensor has been used to determine an angular displacement of a rotor within the electric motor to ensure that excitation voltages used in driving the motor are selected with appropriate precision. However, the use of such Hall-effect sensors may increase the cost of electric motors and may also be subject to misalignment and failure.

SUMMARY

In one embodiment, an apparatus comprises a drive circuit configured to apply a plurality of excitation signals to respective inputs of a motor. A signal inhibit circuit is configured to convey a signal to inhibit application of the plurality of excitation signals during an interval, and a measuring circuit is configured to measure a back-electromotive force (EMF) signal crossing a reference signal during the interval.

In another embodiment, the plurality of excitation signals of the apparatus are pulse-width-modulated excitation signals.

In another embodiment, the drive circuit of the apparatus is configured to modify at least one of the plurality of excitation signals as a result of the back-EMF signal crossing the reference signal during the interval.

In another embodiment, the drive circuit of the apparatus is configured to modify the at least one of the plurality of excitation signals to align with an angular displacement within the motor.

In another embodiment, a method is provided that inhibits a plurality of excitation signals output to a motor. The method determines a time between the inhibiting of the plurality of excitation signals and a crossing of one of the plurality of excitation signals with a reference signal from the motor. The method modifies the plurality of excitation signals as a result of the determined time, and applies the modified plurality of excitation signals to the motor.

In another embodiment, the method further comprises obtaining pulse widths from a lookup table and aligning the plurality of excitation signals with an angular displacement of a rotor portion of the motor using the pulse widths.

In another embodiment, a device comprises a circuit configured to couple a plurality of excitation signals to a motor and a measuring circuit configured to receive a reference signal. The device also comprises logic configured to inhibit the coupling of the plurality of excitation signals to the motor, to measure a time at which a back-electromotive force from the motor drops below a level of the reference signal, and to restart the coupling of the plurality of excitation signals to the motor.

In another embodiment, the logic of the device is further configured to align the plurality of excitation signals with an angular displacement of a rotor of the motor according to the measured time.

In another embodiment, the outputs of the circuit configured to couple a plurality of excitation signals are tri-state amplifiers configured to be set to a high impedance state by the logic configured to inhibit the coupling of the plurality of excitation signals to the motor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are systems, methods, and other embodiments associated with back-electromotive force (EMF) detection for motor control of a fan. In one embodiment, a system detects fan speed using back-EMF detection methods rather than using a Hall-effect sensor. The detection of back-EMF may be used to align electrical cycles of excitation signals with the angular displacement of a rotor in a brushless electric motor driven by pulse-width-modulated (PWM) excitation voltages. The alignment of the electrical cycle with the angular displacement of the rotor may result in quieter and more efficient operation of electric motors used in variable-speed fans and other applications for various electronics systems and devices.

Figure 1:
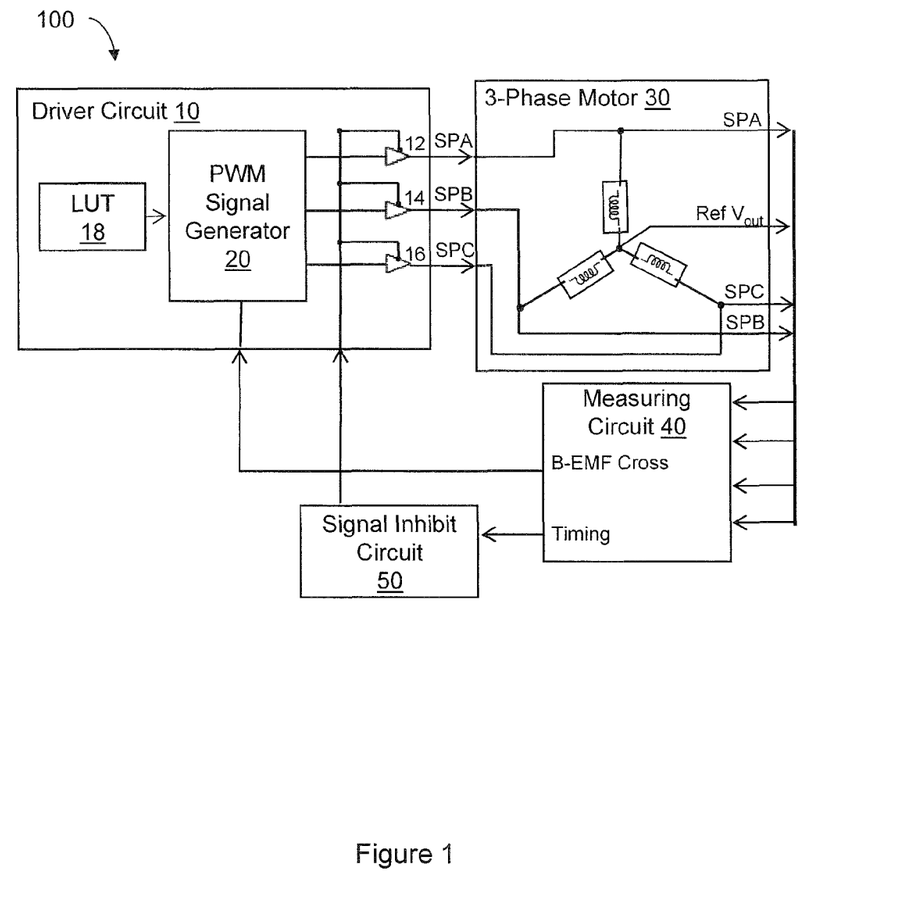
FIG. 1 illustrates an embodiment of an apparatus configured to detect back-EMF signals for controlling a motor.

FIG. 1 illustrates an embodiment of an apparatus 100 configured to detect back-EMF signals for controlling a motor. In FIG. 1, the apparatus 100 is configured with a driver circuit 10, which includes pulse-width-modulated (PWM) signal generator 20. The PWM signal generator 20 obtains PWM coefficients for generating excitation voltage output signals SPA, SPB, SPC from a look-up table (LUT) 18, which are input to a three-phase motor 30 by way of tri-state amplifiers 12, 14, and 16. SPA, SPB, and SPC are the gate drive signals of phase A, phase B, and phase C, respectively.

For purposes of explanation, the three-phase motor 30 is discussed with reference to a select number of electrical components. Possible mechanical/electro-mechanical parts that may be included with a fan are not illustrated in FIG. 1 such as fan blades, a rotor, and so on. The three-phase motor 30 provides outputs representing each excitation voltage signal input (SPA, SPB, and SPC) along with a reference voltage Ref $V_{out}$ to a measuring circuit 40. The measuring circuit 40 is configured to provide timing commands to a signal inhibit circuit 50. The timing commands instruct the signal inhibit circuit 50 when to set the tri-state amplifiers 12, 14, and 16 to a high-impedance state and when to release the tri-state amplifiers from this state.

The measuring circuit 40 also includes a back-EMF reference voltage crossing output (B-EMF Cross) used by the PWM signal generator 20 to modify PWM excitation signals to align with the angular displacement of the rotor within the three-phase motor 30. Modification of PWM signals may occur by adjusting duration of one or more pulses, advancing or delaying one or more pulses in time, and so forth. In one embodiment, the apparatus 100 is implemented on a chip including one or more integrated circuits configured to perform one or more of the functions described herein.

In the embodiment of FIG. 1, the driver circuit 10 includes the PWM signal generator 20 and is configured to generate the excitation voltage outputs SPA, SPB, and SPC by way of the tri-state amplifiers 12, 14, and 16, respectively. In this embodiment, each of the tri-state amplifiers 12, 14, and 16 includes an active high state, an active low state, and a high impedance state. To drive the three-phase motor 30, the excitation voltage outputs SPA, SPB, and SPC comprising PWM signals are generated by the driver circuit 10. In one embodiment, the PWM signals are used to render or to approximate sinusoidal waveforms for use by each phase of the three-phase motor 30. In one embodiment, coefficients that indicate the duration of each PWM signal are stored in the LUT 18. In an embodiment, the driver circuit 10 is configured to generate the PWM signals at a frequency of 25 kHz to 100 kHz, although other embodiments may be implemented with other frequencies.

In one embodiment, the three-phase motor 30 includes four pole pairs, in which four distinct north-south magnetic pairs are formed by way of winding a stator of the motor with four poles for each phase. Accordingly, a stator of the three-phase motor 30 may include 12 electromagnets. In such an embodiment, each mechanical revolution of the three-phase motor 30 occurs every four electrical cycles. One embodiment of the three-phase motor 30 may operate at 25,000 to 100,000 revolutions per minute, although other embodiments may employ three-phase motors having different speeds. Further, the internal connection of the windings of the three-phase motor 30 may be arranged into a "Y" or a "delta" configuration.

The three-phase motor 30 makes use of the three outputs corresponding to each of the three excitation voltage outputs of the driver circuit 10 (outputs SPA, SPB, and SPC). Although the embodiment of FIG. 1 shows each output as being separate from a corresponding input, this example has been chosen for the sake of clarity, and other embodiments can be implemented with one or more combined outputs.

The three-phase motor 30 also includes a reference voltage output (Ref $V_{out}$) that corresponds to a center tap of the motor. Although the three-phase motor 30 has been shown with the phases arranged in a "Y" configuration, in which the reference voltage output corresponds to a node common to the phases, other embodiments may employ a different reference voltage output.

In FIG. 1, at a rate of approximately one time per electrical cycle, the measuring circuit 40 is configured to command the signal inhibit circuit 50 to inhibit the output of the excitation voltages SPA, SPB, and SPC for a brief interval. During this interval, the tri-state amplifiers 12, 14, and 16 are placed in a high-impedance state, thereby prohibiting the excitation voltages from being coupled from the tri-state amplifiers to the three-phase motor 30. During the interval, the measuring circuit 40 evaluates one or more of the excitation voltage outputs SPA, SPB, or SPC to determine when the back-EMF present on one more of the outputs crosses below a reference voltage (e.g. meets or exceeds the reference voltage level in a direction).

In one embodiment, when the measuring circuit 40 determines that the back-EMF has crossed below (falls below) the reference voltage, the measuring circuit 40 determines that a new electrical cycle can begin. In this event, the back-EMF reference voltage crossing signal ("B-EMF Cross" signal in FIG. 1) is activated, thereby instructing the PWM signal generator 20 to correct the coefficients employed to render or to approximate a sinusoidal waveform. In this manner, the apparatus 100 is configured to modify the outputs of the PWM signal generator 20 to align with the angular displacement of the rotor of the three-phase motor 30. The tri-state amplifiers 12, 14, and 16 may then be returned to an active low or an active high state and excitation voltages representing a new electrical cycle can be conveyed to the three-phase motor 30.

In some embodiments, the time interval between the inhibiting of the tri-state amplifiers 12, 14, and 16 and the crossing of the back-EMF signal with the reference voltage may be used to modify the excitation signals to align with the angular displacement of the rotor within the three-phase motor 30. Accordingly, in the event that the time period is relatively long, this may be an indication that the excitation signals and the angular displacement of the rotor within the three-phase motor 30 are significantly out of alignment. In this instance, the driver circuit 10 may determine that large corrections to the waveforms output by the tri-state amplifiers 12, 14, and 16 may be appropriate. In other instances, such as when the measured time period may be relatively short, the driver circuit 10 may determine that only small corrections or perhaps no corrections at all may be appropriate.

With apparatus 100 of FIG. 1, the alignment of excitation voltage outputs from the PWM signal generator 20 with the angular displacement of the rotor within the three-phase motor 30 functions to assist the motor 30 to operate more efficiently. In the event that the voltage excitation signals from the PWM generator 20 are misaligned with the angular displacement of the rotor within the three-phase motor 30, the motor 30 may emit an undesirable "high-pitched whine" while operating. Misalignments between the excitation voltages and the angular displacement of the rotor may also bring about inefficiencies in the operation of the three-phase motor 30 that may result from excess electrical currents flowing among the three phases.

In one embodiment, by setting the tri-state amplifiers 12, 14, and 16 to a high impedance state, recirculation currents, for example currents continuing to flow among the rotor windings of the three-phase motor 30, do not continue to propagate for a noticeable period of time after the setting. In one example in which the three-phase motor 30 operates at an angular velocity of 32,000 revolutions per minute, a back-EMF signal crosses with a reference voltage signal within 500 ns with no significant contribution to the back-EMF due to recirculation currents. Of course, other measurements may be observed depending on the particular implementation.

Figure 2:
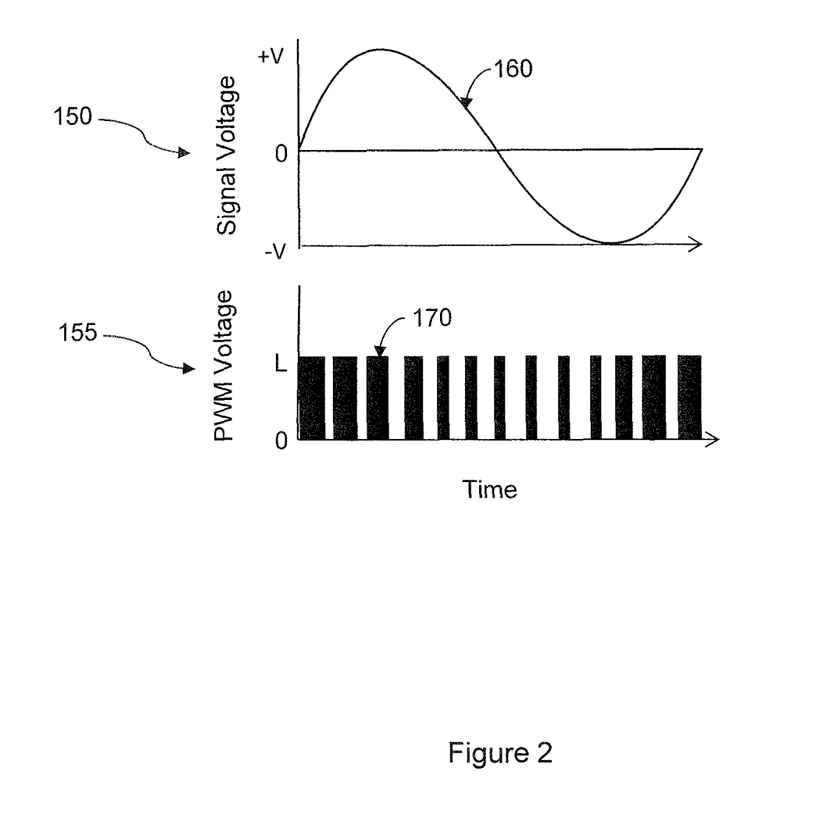
FIG. 2 illustrates an example sinusoidal waveform and an approximation of the sinusoidal waveform using pulse-width-modulated signals.

FIG. 2 illustrates a graph 150 of an idealized example sinusoidal waveform 160 and a graph 155 of an approximation of the sinusoidal waveform 160 using PWM signals 170. The sinusoidal waveform 160 varies periodically between +V and −V as a function of time. PWM signals 170 vary between 0 and amplitude L so that the sinusoidal waveform 160 can be reconstructed. As can be seen in FIG. 2, if the waveform 160 is increasing in amplitude, the PWM signals 170 assume amplitude L for a longer duration than if the waveform 160 is decreasing in amplitude. In an embodiment, the lookup table 18 (of FIG. 1) stores PWM coefficients that describe one or more of amplitude and timing characteristics for the PWM signals 170.

In Table 1 below, example values are provided for the first 33 PWM coefficients corresponding to phases SPA, SPB, and SPC that are shown in FIG. 1. In one embodiment, the values of Table 1 are suitable for storage within a read-only memory of LUT 18 shown in FIG. 1. As can be seen from Table 1, PWM coefficients are used to generate PWM signals according to a schedule that begins with sample 0 and continues through sample 32 and beyond. In one implementation, PWM coefficients are used by PWM signal generator 20 in sequence in a manner that renders or approximates a sinusoidal waveform.

TABLE 1

| Sample | SPA - Coeff. | SPB - Coeff. | SPC - Coeff. |
| --- | --- | --- | --- |
| 0 | 238 | 510 | 90 |
| 1 | 224 | 511 | 108 |
| 2 | 210 | 511 | 126 |
| 3 | 197 | 510 | 144 |
| 4 | 184 | 509 | 162 |
| 5 | 169 | 507 | 180 |
| 6 | 153 | 507 | 196 |
| 7 | 138 | 506 | 211 |
| 8 | 118 | 507 | 225 |
| 9 | 100 | 506 | 239 |
| 10 | 82 | 505 | 251 |
| 11 | 65 | 502 | 263 |
| 12 | 51 | 497 | 275 |
| 13 | 38 | 489 | 289 |
| 14 | 27 | 480 | 301 |
| 15 | 18 | 469 | 315 |
| 16 | 11 | 457 | 328 |
| 17 | 5 | 442 | 343 |
| 18 | 2 | 426 | 358 |
| 19 | 2 | 409 | 374 |
| 20 | 2 | 392 | 391 |
| 21 | 3 | 374 | 409 |
| 22 | 4 | 358 | 425 |
| 23 | 4 | 343 | 441 |
| 24 | 6 | 326 | 456 |
| 25 | 8 | 316 | 469 |
| 26 | 13 | 302 | 480 |
| 27 | 19 | 289 | 490 |

TABLE 1-continued

| Sample | SPA - Coeff. | SPB - Coeff. | SPC - Coeff. |
| --- | --- | --- | --- |
| 28 | 27 | 276 | 497 |
| 29 | 36 | 264 | 503 |
| 30 | 47 | 251 | 506 |
| 31 | 59 | 238 | 508 |
| 32 | 74 | 224 | 510 |

Accordingly, in Table 1 at sample 0, a coefficient for SPA of 238 may be appropriate for generating a sinusoidal waveform beginning at 0°. For SPB, coefficient of 510 may be appropriate for generating a sinusoidal waveform beginning at 120°, while a coefficient of 90 may be appropriate for generating a sinusoidal waveform beginning at 240°. In this manner, sinusoidal waveforms having three phases, with each phase offset by approximately 120° may be generated using coefficients that accord with Table 1. In an embodiment, a complete cycle for each of the phases SPA, SPB, and SPC may require hundreds of coefficients.

Figure 3:
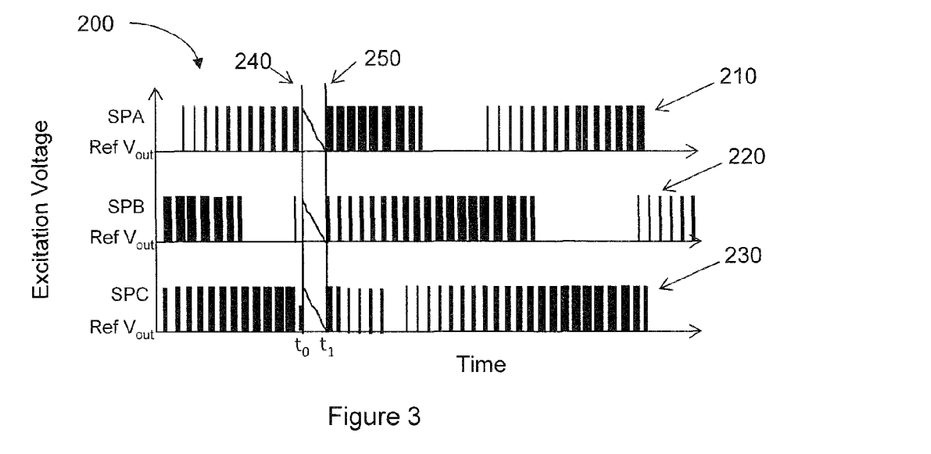
FIG. 3 illustrates examples of waveforms of excitation voltage outputs that may result from one embodiment of the apparatus configured to detect back-EMF signals for controlling a motor.

FIG. 3 illustrates exemplary waveforms 200 of excitation voltage outputs that may result from one embodiment of the apparatus 100 configured to detect back-EMF signals for controlling a motor of a fan. In FIG. 3, waveforms 210, 220, and 230 represent the excitation voltage outputs SPA, SPB, and SPC, respectively. Each waveform of FIG. 3 comprises PWM modulated signals that are "chopped" at a rate of between 25 KHz and 100 KHz, although embodiments of the apparatus 100 are not limited to signals modulated in this range. When the waveforms are received by the three-phase motor 30 of FIG. 1, the signals render or approximate a sinusoidal waveform within the stator windings of the motor 30 as described with reference to FIG. 2. FIG. 3 also shows signal inhibit line 240, occurring at time $t_0$, at which the voltage excitation signals have been inhibited. The inhibiting of SPA, SPB, and SPC may be brought about by placing an output tri-state amplifier into a high-impedance state, such as discussed with reference to FIG. 1, in one embodiment.

In FIG. 3, when each of the voltage excitation signals is inhibited, a decaying signal can be seen as continuing for some duration after time $t_0$. This decaying signal represents the back-EMF from each phase of the three-phase motor 30. As can also be seen in FIG. 3, the decaying signals begin to fall below a reference voltage line at a time $t_1$, shown by signal restart line 250 at which the PWM signals may again be coupled to the inputs of the three-phase motor 30. The interval between $t_0$ and $t_1$ may be used to modify the excitation signals to align with the angular displacement of the rotor within the motor 30. In one embodiment, an inhibiting of excitation voltage outputs may occur approximately once per electrical cycle of a three-phase motor.

In some experiments, the momentary setting of voltage excitation signals to a high impedance state has not caused in a noticeable impact on the performance of the motor 30. For example, the momentary setting of voltage excitation signals to a high impedance state typically does not cause the electric motor 30 to "hunch," in which an electric motor periodically increases and decreases in angular velocity. In these embodiments, it is contemplated that the inertia of the moving parts of the motor, such as fan blades, rotors, and intervening linkages allow the motor to glide through these brief events and maintain a substantially constant speed.

Figure 4:
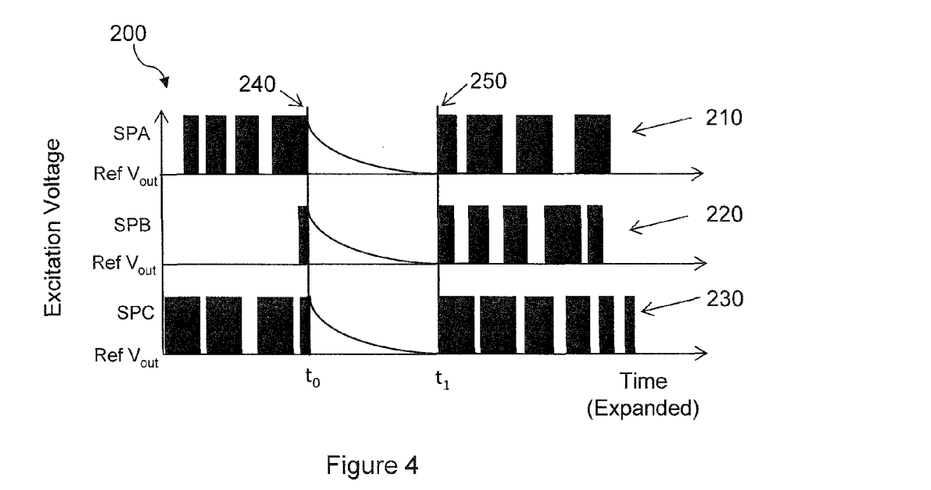
FIG. 4 illustrates examples of waveforms of excitation voltage outputs that may result from one embodiment of the apparatus configured to detect back-EMF signals for controlling a motor.

FIG. 4 illustrates waveforms of excitation voltage outputs that may result from one embodiment of the apparatus 100 configured to detect back-EMF signals for controlling a motor. In FIG. 4, an expanded timescale has been used to clearly show the decay of the back-EMF present on the voltage excitation signals SPA, SPB, and SPC. FIG. 4 shows in greater detail the exponential nature of the decay of the back-EMF signal from each of the voltage excitation inputs. However, in other embodiments, a back-EMF signal may exhibit a decay profile that does not approximate a decaying exponential.

Figure 5:
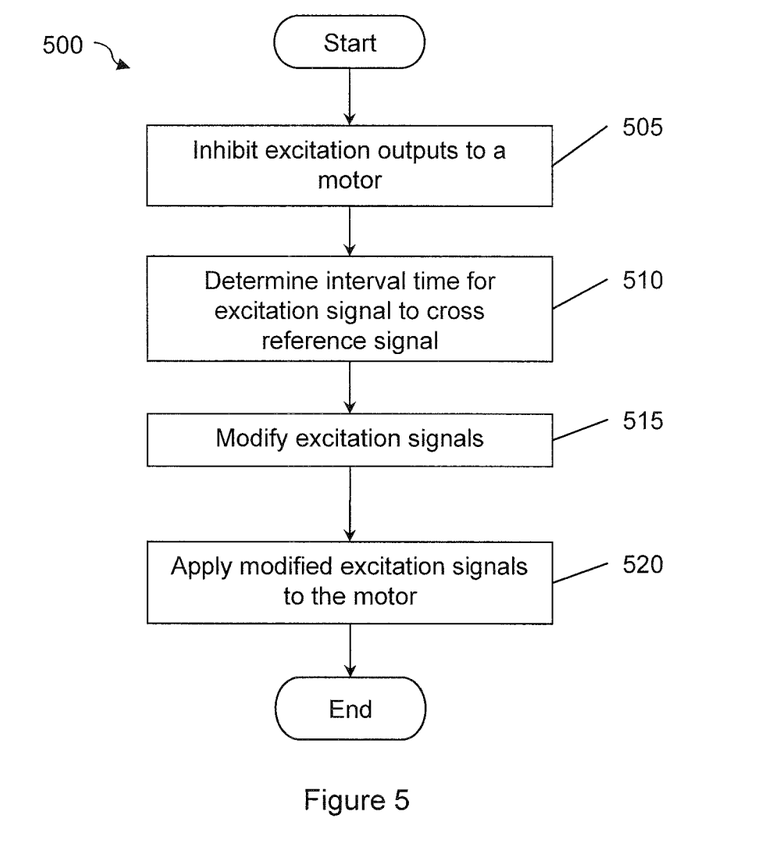
FIG. 5 illustrates one embodiment of a method associated with an apparatus configured to detect back-EMF signals for controlling a motor.

FIG. 5 illustrates one embodiment of a method 500 associated with an apparatus configured to detect back-EMF signals for controlling a motor. Method 500 is discussed with reference to the apparatus 100 shown in FIG. 1, although the method may be practiced using other configurations. At 505, the method begins by inhibiting excitation outputs to a motor for an interval. At 510, a time between a beginning of the interval and a crossing of an excitation voltage signal with a reference signal from the motor is determined. The reference signal may correspond to a signal present at a center tap of a three-phase motor or may correspond to any other type of reference signal. As a result of 510, pulse widths that align the excitation signals with an angular displacement of a rotor portion of the motor are obtained from a lookup table. At 515, the excitation signals are modified as a result of the determined time. At 520, the modified excitation signals are applied to the motor. In one embodiment, this may include obtaining pulse widths from the lookup table, and aligning the plurality of excitation signals with an angular displacement of a rotor portion of the motor using the pulse widths. In this manner, the excitation signals are restarted as a result of determining the time between the beginning of the interval and the crossing of the excitation signal.

Accordingly, embodiments described herein permit the use of BEMF detection for electric motor control without the need for Hall-effect sensors. To perform the control function using BEMF, excitation outputs are placed in a high impedance state, which allows recirculation currents within the motor to decay. In some embodiments, by setting excitation outputs coupled to each of the three phases of an electric motor to a high impedance state, recirculation currents within the motor are allowed to decay over a period that is small relative to the electrical cycle of the motor. In some embodiments, allowing recirculation currents to rapidly decay allows an electric motor to operate efficiently at a high rate of speed. This allows electric motor-driven fans to provide increased cooling without increasing the size of the electric motor.

Definitions

The following includes definitions of selected terms employed herein. The definitions include various examples and/or forms of components that fall within the scope of a teem and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic unit. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    a drive circuit configured to apply a plurality of excitation signals to respective inputs of a motor;
    a signal inhibit circuit configured to convey a signal to inhibit application of the plurality of excitation signals for an interval, wherein the plurality of excitation signals include three excitation signals, and wherein the signal inhibit circuit is configured to inhibit all three of the excitation signals simultaneously for a same duration that is the interval; and
    a measuring circuit configured to measure when a back-electromotive force (EMF) signal crosses a reference signal to determine a length of the interval, wherein the length of the interval is an amount of time for the back-electromotive force to decay to the reference voltage, and wherein the interval varies according to the back-electromotive force.

2. The apparatus of claim 1, wherein the plurality of excitation signals are pulse-width-modulated excitation signals.

3. The apparatus of claim 2, wherein at least one of the plurality of pulse-width-modulated excitation signals approximates a sinusoidal waveform.

4. The apparatus of claim 1, wherein the drive circuit is configured to modify at least one of the plurality of excitation signals according to the determined length of the interval.

5. The apparatus of claim 4, wherein the drive circuit is configured to modify the at least one of the plurality of excitation signals to align with an angular displacement within the motor.

6. The apparatus of claim 1, wherein outputs of the drive circuit are configured to inhibit the plurality of excitation signals.

7. The apparatus of claim 1, wherein the motor is configured to include three phases and wherein the reference signal corresponds to a voltage at a center tap of the motor.

8. The apparatus of claim 1, wherein the interval occurs approximately one time during an electrical cycle of the plurality of excitation signals.

9. A method, comprising:
   inhibiting a plurality of excitation signals output to a motor, wherein the plurality of excitation signals include three excitation signals, and wherein inhibiting the plurality of excitation signals includes inhibiting all three of the excitation signals simultaneously for a same time;
   determining the time between the inhibiting of the plurality of excitation signals and a crossing of a back electro motive force (EMF) signal from the motor with a reference signal from the motor;
   modifying the plurality of excitation signals as a result of the determined time; and
   applying the modified plurality of excitation signals to the motor, wherein the time is an amount of time for the back-electromotive force to decay to the reference voltage, and wherein the time varies according to the back-electromotive force.

10. The method of claim 9, wherein the inhibiting comprises:
    increasing output impedance of a plurality of output amplifiers supplying the plurality of excitation signals, wherein the reference signal is a constant zero volts.

11. The method of claim 9, wherein the reference signal corresponds to a signal present on a center tap of the motor.

12. The method of claim 9, wherein the applying further comprises:
    obtaining pulse widths from a lookup table, and aligning the plurality of excitation signals with an angular displacement of a rotor portion of the motor using the pulse widths.

13. The method of claim 9, wherein the inhibiting occurs approximately once per electrical cycle of the plurality of the excitation signals.

14. A device comprising:
    a circuit configured to couple a plurality of excitation signals to a motor, wherein the plurality of excitation signals include three excitation signals that are each associated with a different terminal of the motor;
    a measuring circuit configured to receive a reference signal; and
    logic configured to:
        inhibit the coupling of the plurality of excitation signals to the motor, wherein the logic is configured to inhibit all three of the excitation signals simultaneously for a same time;
        measure the time at which a back-electromotive force from the motor drops below a level of the reference signal while the plurality of excitation signals are inhibited; and
        modify the plurality of excitation signals based, at least in part, on the time, wherein the measured time is an amount of time for the back-electromotive force to decay to the reference voltage, and wherein the measured time varies according to the back-electromotive force.

15. The device of claim 14, wherein the logic is further configured to align the plurality of excitation signals with an angular displacement of a rotor of the motor according to the measured time.

16. The device of claim 15, wherein the logic is further configured to determine pulse-width-modulation coefficients that align the plurality of excitation signals with the angular displacement of a rotor of the motor.

17. The device of claim 14, wherein the plurality of excitation signals are coupled to a three-phase motor, and wherein the plurality of excitation signals include at least the three excitation signals.

18. The device of claim 14, wherein outputs of the circuit configured to couple a plurality of excitation signals are tri-state amplifiers configured to be set to a high impedance state by the logic configured to inhibit the coupling of the plurality of excitation signals to the motor.

19. The device of claim 14, wherein the reference signal corresponds to a center tap of the motor.

20. The device of claim 14, further comprising:
    restart the coupling of the plurality of excitation signals to the motor upon the back-electromotive force from the motor dropping below the level of the reference signal.

* * * * *